United States Patent [19]

Manning

[11] Patent Number: 5,044,667
[45] Date of Patent: Sep. 3, 1991

[54] PULL-AWAY MUD FLAP

[76] Inventor: Kenneth G. Manning, 3140 E. M-72, Harrisville, Mich. 48740

[21] Appl. No.: 498,433

[22] Filed: Mar. 26, 1990

[51] Int. Cl.$^5$ .............................................. B62D 25/18
[52] U.S. Cl. .................................................... 280/851
[58] Field of Search ......................... 280/847, 848, 851

[56] References Cited

U.S. PATENT DOCUMENTS 3,700,260 10/1972 Moore et al. ........................ 280/851
4,326,727 4/1982 Rock .................................... 280/851

Primary Examiner—Andres Kashnikow
Assistant Examiner—Richard Camby
Attorney, Agent, or Firm—Remy J. VanOphem

[57] ABSTRACT

A mud flap which can be easily installed and removed from its mounting bracket is provided. The mud flap is substantially planar in form with a predetermined thickness. The mud flap has a peripheral edge whose cross section is larger than the predetermined thickness of the mud flap. The mounting bracket includes a bracket body from which two flanges extend downwardly. The flanges converge towards one another at their lower ends, forming a slot therebetween. The mounting bracket is provided with any conventional method for mounting the mounting bracket behind the tire of a vehicle. The mud flap is suspended from the mounting bracket by engaging the peripheral edge of the mud flap with the slot of the mounting bracket. The peripheral edge of the mud flap is engaged with the slot of the mounting bracket by inserting the peripheral edge through either end of the slot.

8 Claims, 2 Drawing Sheets

PULL-AWAY MUD FLAP

BACKGROUND OF THE INVENTION

1. Field of the Invention

The present invention generally relates to mud flaps for use on motor vehicles. More specifically, this invention relates to a mud flap which is designed to be readily installed and removed from its mounting bracket, and which can be forcibly dislodged from its mounting bracket without damage to either the mud flap or the mounting bracket.

2. Description of the Prior Art

Mud flaps are commonly used behind the tires of motor vehicles to minimize the quantity of water mist, dirt and stones thrown while the tires are rotating. Mud flaps are particularly useful on trucks, tractors and trailers as these have the greatest potential for causing harm because of their tire size and because of the extent that the tire is open and exposed to the surroundings. The typical methods for mounting mud flaps in these applications involve either providing clamps to attach the mud flap to the frame of the vehicle, or providing a support member mounted to the frame from which the mud flaps are hung.

A disadvantage to both of these arrangements is the inconvenience of installing and replacing the mud flap when it is in need of replacement or is accidentally pulled from the truck frame or the mud flap support member. If clamps are used to mount the mud flap, removal and installation of the mud flap is generally time consuming and cumbersome due to the various fasteners or clamps which need to be released. Similarly, when support members are used the mud flap is often riveted or fastened to the member. This arrangement typically requires even more time and often additional tools to complete the replacement of the mud flap.

It can be readily appreciated that the procedure used to install and replace the mud flap or support member can easily become more complicated when replacement is necessitated because of damage to either the mud flap or the support member. A common cause of damage to mud flaps and their support members occurs when the vehicle is backing up and the mud flap is trapped between the tire and a ground obstacle or the truck frame. When this occurs the mud flap is either torn from the support member, or the support member is bent or torn from the vehicle, or both. In either event replacement of the damaged member is necessary, incurring additional costs and time.

One method for mounting mud flaps which is directed at improving their installation and removal is taught by U.S. Pat. No. 3,877,722 to Conner. There, a three-piece transversely mounted support is provided for mounting a pair of mud flaps. The support is clamped to the truck frame and the mud flaps are fastened to the support members by rivets or similar fasteners. This arrangement allows for transferring the entire assembly between vehicles in one section.

However, the Conner mud flap assembly does not provide any improvement in ease of installation and removal of the mud flap itself. Replacement of the mud flap is most preferably accomplished by removing the entire transversely mounted support first, incurring added time. Further, if the mud flap is trapped against a ground obstacle or truck frame as described above, the transversely mounted support can sustain such severe damage that it is rendered unusable, resulting in additional expenses to replace it as well.

Another mounting method is taught by U.S. Pat. No. 4,505,010 to Arenhold. Arenhold teaches a screw-actuated spring clamp intended to clamp the mud flap to a body panel or the frame. The screw must be turned appropriately in order to mount or release the mud flap from the vehicle. This arrangement provides a more durable mounting method than Conner but is encumbered by the need for tools to loosen and tighten the clamps when replacement of the mud flap is necessary. Similar to Conner, in the situation where the mud flap is trapped against a ground obstacle or the truck, the mud flap can easily be torn. Another undesirable result is that the clamps can be elastically deformed as to render them useless, or the clamps may be lost all together.

As can be appreciated from the above, it is desirable to mount mud flaps in a manner that allows ready installation and removal of the mud flaps. It is additionally desirable to provide a mud flap whose mounting means allows for accidental dislodging of the mud flap without damage to itself or its support member.

Accordingly, what is needed is a mud flap and a method for mounting the mud flap which provides for ease of installation and removal of the mud flap while also preventing damage to the mud flap and mounting bracket when the mud flap is forcibly dislodged from the mounting bracket.

SUMMARY OF THE INVENTION

According to the present invention there is provided a mud flap with an accompanying mounting bracket. The mud flap is made of any flexible material, such as rubber, plastic or laminated cardboard, and is generally planar in shape with a thin cross-section. The mud flap has at least one edge whose crosssection is substantially thicker than that of the rest of the mud flap.

The mounting bracket can be made from any rigid but resilient material, such as metal or plastic. The mounting bracket has a bracket body from which two flanges extend downwardly. The flanges converge towards one another at their lower ends, forming a slot therebetween. The mounting bracket is provided with any conventional method for mounting to a vehicle, such as rivets, screws or bolts.

The mud flap is hung from the mounting bracket by engaging the thicker edge of the mud flap with the slot of the mounting bracket. This can most readily be accomplished by sliding the thicker edge of the mud flap into the slot from either end of the slot. Friction created by a slight interference fit between the thicker edge of the mud flap and the slot secure the mud flap within the mounting bracket.

According to a preferred aspect of this invention, an inventive feature is that the mud flap can be mounted to the mounting bracket without the need for any tools. The mud flap can easily be installed and removed in a matter of seconds, regardless of whether the mounting bracket is already mounted to a vehicle.

In addition, a significant advantage of the present invention is that the mud flap and mounting bracket will not be damaged if the mud flap is forcibly dislodged from the mounting bracket. The mounting bracket flanges elastically separate to allow the mud flap to be released from the mounting bracket thereby preventing the tearing of the mud flap and the deformation or breakage of the mounting bracket.

Accordingly, it is an object of the present invention to provide a mud flap and mounting bracket assembly for use behind the tires of motor vehicles.

It is a further object of this invention that such mud flap be easily installed and removed from the mounting bracket.

It is still a further object of this invention that such mud flap and mounting bracket be designed such that no damage occurs to either the mud flap or the mounting bracket when the mud flap is forcibly dislodged from the mounting bracket.

Other objects and advantages of this invention will be more apparent after a reading of the following detailed description taken in conjunction with the drawings provided.

DETAILED DESCRIPTION OF THE PREFERRED EMBODIMENT

Figure 1:
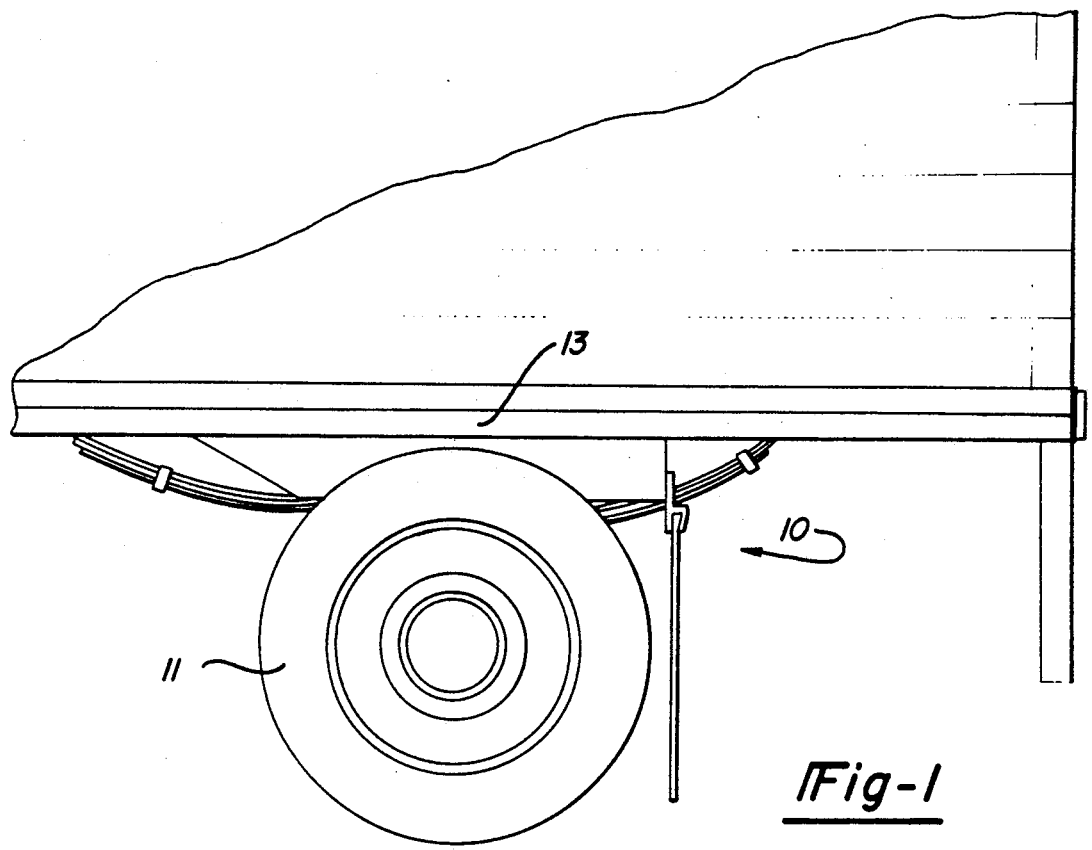
FIG. 1 shows a mud flap assembly mounted behind the tire of a truck in accordance with a preferred embodiment of this invention.
Figure 2:
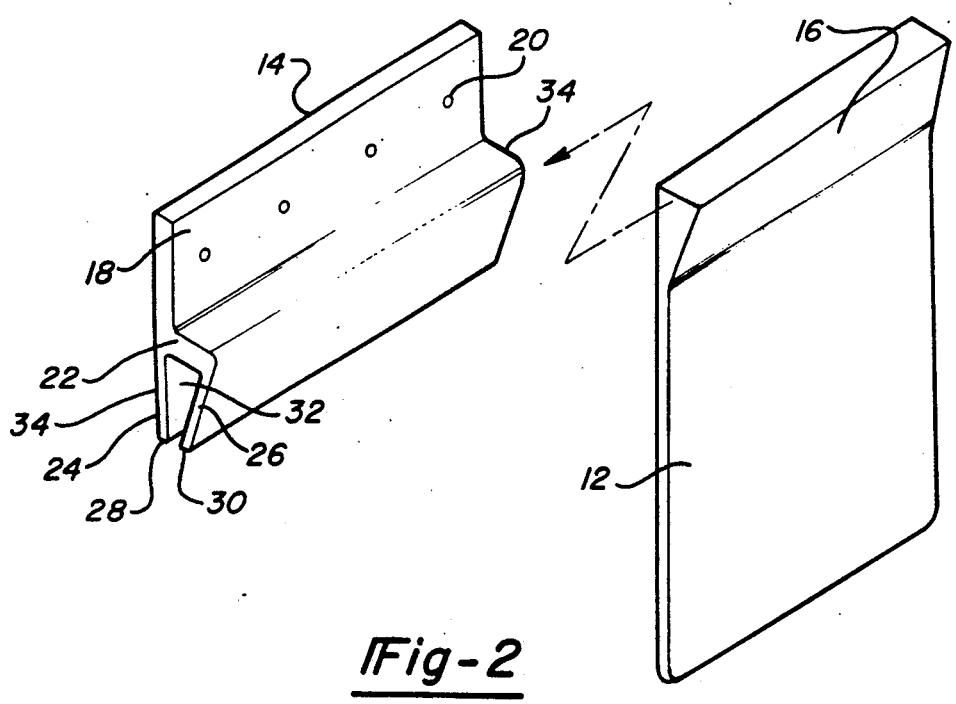
FIG. 2 is an exploded view of the mud flap assembly of FIG. 1 in accordance with a preferred embodiment of this invention.

In a preferred embodiment of this invention, a mud flap assembly 10 is provided for use behind the tire 11 of a truck 13, as shown in FIG. 1, or alternatively a tractor or trailer. The mud flap assembly 10 is composed of a mud flap 12 and a mounting bracket 14, as shown in FIG. 2. The mud flap 12 is preferably made of any flexible material, such as rubber, plastic or laminated cardboard. The mud flap 12 is substantially planar in shape having a thin cross-section, and has a peripheral edge 16. The peripheral edge 16 has a cross-section which is thicker than the main portion of the mud flap 12.

In a preferred embodiment the cross-section of the peripheral edge 16 is flared towards its distal edge such that its cross-section resembles an inverted triangle. It is preferred that the cross-sectional thickness of the peripheral edge 16 be several times thicker, about three to five times, than the cross-sectional thickness of the main portion of the mud flap 12. This ensures rigid retention of the peripheral edge 16 of the mud flap 12 within the mounting bracket 14, while still permitting relatively easy manufacturability of the mud flap 12. However, as will be evident from a reading of the following description, various cross-sectional forms can be employed to obtain satisfactory results.

The mounting bracket 14 is generally elongated in shape and is preferably made from any rigid but resilient material, such as metal or plastic. The mounting bracket 14 has a bracket body 18 with a plurality of apertures 20 therethrough for mounting the mounting bracket 14 to the truck or other vehicle. The number of apetures 20 must be sufficient to ensure rigid retention of the mounting bracket 14 with the vehicle. As shown in FIG. 2, approximately four apertures 20 are sufficient. The mounting bracket 14 also has a lower branch member 22 having a first flange 24 and a second flange 26 extending downwardly therefrom. The first flange 24 and the second flange 26 converge towards one another to form a slot 32 wherein the mud flap 12 will subsequently be retained. First and second ends 28 and 30 of the first flange 24 and the second flange 26, respectively, are disposed opposite to the lower branch member 22 on each flange 24 and 26. The first and second ends 28 and 30 are substantially parallel to each other and provide a bottom opening which extends the length of the slot 32 from which the mud flap 12 will hang downwardly.

Figure 3:
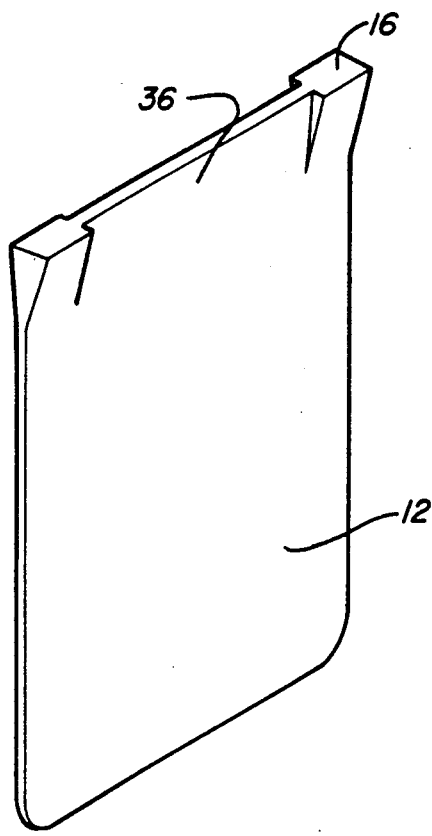
FIG. 3 illustrates an alternative embodiment of a mud flap for use with the mounting bracket of FIG. 2.

In a preferred embodiment, the cross-section of the slot 32 corresponds to the cross-section of the peripheral edge 16 of the mud flap 12. It is preferred that the cross-section of both the slot 32 and the peripheral edge 16 be triangular, since this form is relatively easy to manufacture yet readily provides the benefits of this invention. However, other suitable cross-sectional forms are acceptable, such as square or circular cross-sectional forms. Although it is preferred that the cross-sections of the slot 32 and the peripheral edge 16 of the mud flap 12 correspond, it is not functionally necessary for these cross-sections to be similar so long as there is a friction fit between the peripheral edge 16 of the mud flap 12 and the slot 32 of the mounting bracket 14. Additionally, the peripheral edge 16 may be provided with a relief 36, shown in FIG. 3, to reduce the friction between the peripheral edge 16 and the slot 32. This feature facilitates the installation of the peripheral edge 16 into the slot 32 while maintaining sufficient friction for retention purposes.

The mud flap 12 can most readily be mounted to the mounting bracket 14 by sliding the peripheral edge 16 of the mud flap 12 into the slot 32 from either end 34 of the slot 32. The mud flap 12 is secured to the mounting bracket 14 through a slight interference fit between the peripheral edge 16 and the slot 32, which is provided by the resilience of both the mud flap 12 and the mounting bracket 14. The mud flap 12 is, therefore, releasably engaged within the slot 32 of the mounting bracket 14. In contrast to the prior art, the mounting bracket 14 may be rigidly secured to the vehicle before or after mounting of the mud flap 12 within the slot 32 of the mounting bracket 14.

Figure 4:
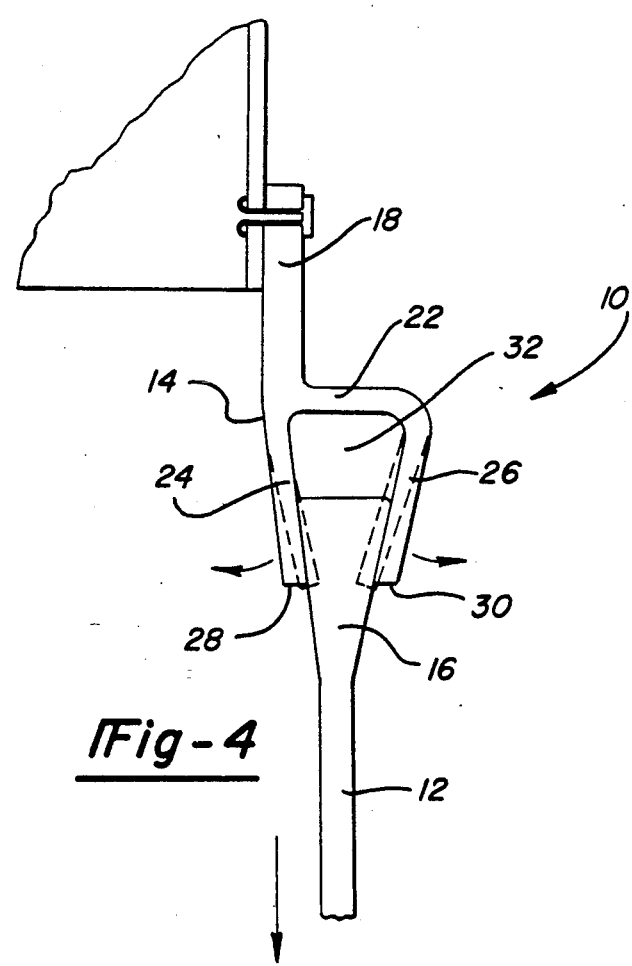
FIG. 4 is a cross-sectional view of the mud flap assembly of FIG. 1 during the vertical dislodging of the mud flap from the mounting bracket.

A significant advantage of providing a mud flap 12 with a peripheral edge 16 having a cross-section which is thicker than the body of the mud flap 12 is that when the mud flap 12 is forcibly pulled away from the mounting bracket 14 as shown in FIG. 4, the first flange 24 and second flange 26 separate sufficiently to allow the peripheral edge 16 of the mud flap 12 to pull free without damage to either the mud flap 12 or the mounting bracket 14. Additionally, the mud flap 12 can be easily reinstalled and removed from the mounting bracket 14 with a minimal amount of time and without the need for any tools.

While the invention has been described in terms of a preferred embodiment, it is apparent that other forms could be adopted by one skilled in the art. An example is providing the peripheral edge 16 of the mud flap 12 with another shape, such as a circular or square cross-section. Accordingly, the scope of the invention is to be limited only by the following claims.

What is claimed is:

1. A mud flap assembly mountable to a vehicle behind a tire thereof comprising:

an "h" shaped mounting bracket having a body portion, a first planar flange having an upper end integral with said body portion, a second planar flange offset from said body portion and said first planar flange, a transverse branch member generally normal to said body portion which integrally connects an upper end of said second planar flange to said body portion and means for connecting said mounting bracket to said vehicle, said first and second planar flanges converging towards each other at the ends opposite said upper ends thereof to form a tapered slot having a bottom opening, said first and second flanges being resiliently displaceable relative to each other; and a mud flap having a flexible rectangular body and an upper end received in said tapered slot, said flexible rectangular body descending from said mounting bracket through said bottom opening of said tapered slot, said flexible rectangular body having a cross-sectional thickness approximately equal to the width of said bottom opening, said upper end having a cross-sectional thickness substantially greater than the cross-sectional thickness of said flexible rectangular body, said cross-sectional thickness of said upper end selected to be slidably receivable in said tapered slot.

2. The mud flap assembly of claim 1 wherein said upper end of said mud flap is tapered from said cross-sectional thickness of said flexible rectangular body to said cross-sectional thickness of said upper end to form a tapered end having a cross section corresponding to a cross section of said tapered slot.

3. The mud flap assembly of claim 2 wherein a relief is provided in said upper end in a medial section thereof, said relief having a cross-sectional thickness less than the cross-sectional thickness of the remaining portions of said upper end.

4. A mud flap mountable behind the wheels of a truck, tractor, or trailer comprising:

a mounting bracket having a generally "h" shaped cross section, said mounting bracket having a body portion, a first planar flange having an upper end integral with said body portion and a lower end, a branch portion integral with said body portion and extending in a direction normal thereto; and a second planar flange offset from said first planar flange, said second planar flange having an upper end integral with said branch portion and a lower end, said first and second planar flanges converging towards each other at said lower ends to form a tapered slot, said tapered slot having a lateral bottom opening having a width defined by the spacing between said lower ends of said first and second planar flanges;

a mud flap having an upper end disposed in said tapered slot and a flexible rectangular body extending downwardly from said tapered slot through said bottom opening, said flexible rectangular body having a cross-sectional thickness substantially equal to said width of said lateral bottom opening, said upper end having a tapered cross section corresponding to the cross section of said tapered slot; and means for attaching said mounting bracket to said trucks, tractors, and trailers.

5. The mud flap assembly of claim 4 wherein said mounting bracket is made from a resilient material which permits said lower ends of said first and second planar flanges to be displaced away from each other to release said upper end of said mud flap from said tapered slot when a force on said mud flap exceeds a predetermined value.

6. The mud flap assembly of claim 5 having a relief provided in said upper end in a medial section thereof, said relief having a cross-sectional thickness less than a maximum cross-sectional thickness of said upper end.

7. An "h" shaped mounting bracket for mounting a mud flap behind a wheel of a vehicle comprising:

a planar body portion having means for attaching said body portion to said vehicle behind said wheel;

a first planar flange portion having an upper end integral with said body portion and a lower end;

an integral branch member extending in a direction substantially normal to said planar body portion; and a second planar flange portion offset from said planar body portion, said second planar flange portion having an upper end integral with said branch member and a lower end, said lower ends of said first and second planar flange portions converging towards each other to form a tapered slot in which an upper end of said mud flap is slidably received, said tapered slot having a bottom opening defined by said lower ends of said first and second planar flange portions through which a lower portion of said mud flap extends.

8. The "h" shaped mounting bracket of claim 7 wherein said mounting bracket is made from a resilient material which permits said lower ends of said first and second planar flange portions to be displaced away from each other to release said mud flap from said tapered slot when a force applied to said mud flap exceeds a predetermined value.

* * * * *

UNITED STATES PATENT AND TRADEMARK OFFICE
CERTIFICATE OF CORRECTION

PATENT NO. : 5,044,667

DATED : September 3, 1991

INVENTOR(S) : Kenneth G. Manning

It is certified that error appears in the above-identified patent and that said Letters Patent is hereby corrected as shown below:

Column 2, line 36, delete "crosssection and insert ---- cross section ----.

Column 5, line 34, after "flap" insert ---- assembly ----.

Signed and Sealed this

Fifteenth Day of December, 1992

Attest:

DOUGLAS B. COMER

*Attesting Officer*    *Acting Commissioner of Patents and Trademarks*